United States Patent
Kim et al.

(10) Patent No.: US 12,493,781 B2
(45) Date of Patent: *Dec. 9, 2025

(54) NEUROMORPHIC PROCESSOR AND OPERATING METHOD THEREOF

(71) Applicant: SAMSUNG ELECTRONICS CO., LTD., Suwon-si (KR)

(72) Inventors: Jae-Joon Kim, Pohang-si (KR); Jinseok Kim, Incheon (KR); Taesu Kim, Incheon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 111 days.

This patent is subject to a terminal disclaimer.

(21) Appl. No.: 18/197,093

(22) Filed: May 14, 2023

(65) Prior Publication Data

US 2023/0281436 A1 Sep. 7, 2023

Related U.S. Application Data

(63) Continuation of application No. 16/451,586, filed on Jun. 25, 2019, now Pat. No. 11,694,067.

(30) Foreign Application Priority Data

Jun. 27, 2018 (KR) .................. 10-2018-0074265

(51) Int. Cl.
*G06N 3/10* (2006.01)
*G06F 17/16* (2006.01)
(Continued)

(52) U.S. Cl.
CPC ............. *G06N 3/063* (2013.01); *G06F 17/16* (2013.01); *G06N 3/049* (2013.01)

(58) Field of Classification Search
CPC ........ G06N 3/063; G06N 3/049; G06N 3/088; G06F 17/16

See application file for complete search history.

(56) References Cited

U.S. PATENT DOCUMENTS

| | | |
|---|---|---|
| 8,843,425 B2 | 9/2014 | Modha |
| 9,218,564 B2 | 12/2015 | Arthur et al. |

(Continued)

FOREIGN PATENT DOCUMENTS

| | | |
|---|---|---|
| KR | 10-1686827 | 12/2016 |
| KR | 10-2017-0080452 A | 7/2017 |
| KR | 10-2018-0028966 A | 3/2018 |

OTHER PUBLICATIONS

Korean Office Action issued on Dec. 28, 2022, in counterpart of Korean Patent Application No. 10-2018-0074265 (5 pages in English, 5 pages in Korean).

(Continued)

*Primary Examiner* — Brandon S Cole
(74) *Attorney, Agent, or Firm* — NSIP Law

(57) ABSTRACT

A method for processing data based on a neural network including a first layer including axons and a second layer including neurons, includes receiving synaptic weights between the first layer and the second layer; generating presynaptic weights, a number of which is identical to a number of the axons, and postsynaptic weights, a number of which is identical to a number of the synaptic weights, from the synaptic weights; and storing the presynaptic weights and the postsynaptic weights in a synapse memory.

9 Claims, 12 Drawing Sheets

(51) Int. Cl.
*G06N 3/049* (2023.01)
*G06N 3/063* (2023.01)
*G06N 3/08* (2023.01)

(56) References Cited

U.S. PATENT DOCUMENTS

| | | |
|---|---|---|
| 2012/0259804 A1 | 10/2012 | Brezzo et al. |
| 2012/0323832 A1* | 12/2012 | Snook .................. G06N 3/10 706/27 |
| 2013/0073497 A1 | 3/2013 | Akopyan et al. |
| 2014/0114893 A1 | 4/2014 | Arthur et al. |
| 2015/0106316 A1 | 4/2015 | Birdwell et al. |
| 2015/0206050 A1* | 7/2015 | Talathi .................. G06N 3/048 706/15 |
| 2016/0350647 A1* | 12/2016 | Hosokawa ............. G06N 3/065 |
| 2017/0193356 A1 | 7/2017 | Park et al. |
| 2018/0075344 A1 | 3/2018 | Ma et al. |
| 2019/0019538 A1 | 1/2019 | Li et al. |

OTHER PUBLICATIONS

Merolla, Paul A., et al. "A million spiking-neuron integrated circuit with a scalable communication network and interface." *Science* 345.6197 (Aug. 8, 2014): pp. 668-679.

Merolla, Paul, et al. "A digital neurosynaptic core using embedded crossbar memory with 45pJ per spike in 45nm." *2011 IEEE custom integrated circuits conference (CICC)*. IEEE, 2011.

Seo, Jae-sun, et al. "A 45nm CMOS neuromorphic chip with a scalable architecture for learning in networks of spiking neurons." *2011 IEEE Custom Integrated Circuits Conference (CICC)*. IEEE, 2011. pp.1-4.

Korean Office Action issued on Sep. 26, 2023, in counterpart Korean Patent Application No. 10-2018-0074265 (4 pages in English, 5 pages in Korean).

* cited by examiner

NEUROMORPHIC PROCESSOR AND OPERATING METHOD THEREOF

CROSS-REFERENCE TO RELATED APPLICATIONS

This application is a continuation of application Ser. No. 16/451,586, filed on Jun. 25, 2019, which claims priority under 35 U.S.C. § 119 to Korean Patent Application No. 10-2018-0074265 filed on Jun. 27, 2018, in the Korean Intellectual Property Office, the entire disclosure of which are incorporated herein by reference for all purposes.

BACKGROUND

Embodiments of the inventive concepts described herein relate to a neuromorphic processor, and more particularly, relate to a neuromorphic processor to decompose a synaptic weight between an axon and a neuron and an operating method thereof.

The brain contains hundreds of billions of nerve cells, that is, neurons, each of which may learn and remember information while exchanging signals with another neuron through synapses. When a sum of synapse potentials input through dendrites is greater than a threshold potential, the neuron may generate an action potential to transfer a signal to another neuron through an axon. This is called "spiking of a neuron". In the case where the spiking of the neuron occurs, the intensity of the signal transferred from the neuron may vary with the connection strength of a synapse between a neuron and another neuron. That is, the intensity of the signal that is transferred to the neuron may vary when the connection strength of the synapse is adjusted, and thus, the learning and memory of information may be made.

The neuromorphic processor is a semiconductor circuit designed to mimic a process where a biological nerve cell (or a neuron) transfers and processes information. The neuromorphic processor may store a synaptic weight being a value corresponding to the connection strength of the synapse in a memory and may perform signal processing based on the stored weight. That is, the neuromorphic processor may be used to implement a system that is intellectualized to mimic the brain of the human. Accordingly, the neuromorphic processor may be used for character recognition, voice recognition, danger recognition, real-time high-speed signal processing, etc.

However, because there are a large lot of synapses connecting neurons, the neuromorphic processor may require a very great memory usage for the purpose of storing weight values for the synapses. This may mean that the size of the memory included in the neuromorphic processor become large and that the chip area of the neuromorphic processor increases.

SUMMARY

Embodiments of the inventive concepts provide a neuromorphic processor capable of reducing the size of a memory used to store synaptic weights and an operating method thereof.

According to an embodiment of the inventive concepts, an operating method of a neuromorphic processor which processes data based on a neural network including a first layer including axons and a second layer including neurons includes receiving synaptic weights between the first layer and the second layer, decomposing the synaptic weights into presynaptic weights, a number of which is identical to a number of the axons, and postsynaptic weights, a number of which is identical to a number of the synaptic weights, and storing the presynaptic weights and the postsynaptic weights. A precision of each of the synaptic weights is a first number of bits, a precision of each of the presynaptic weights is a second number of bits, and a precision of each of the postsynaptic weights is a third number of bits. The third number of the bits is smaller than the first number of the bits.

In an embodiment, the synaptic weights may form an M×N weight matrix, the presynaptic weights may form a first sub-weight matrix being an M×1 matrix, the postsynaptic weights may form a second sub-weight matrix being an M×N matrix, the "M" may be a natural number corresponding to the number of the axons, and the "N" may be a natural number corresponding to the number of the neurons.

In an embodiment, the decomposing may include generating the postsynaptic weights, and generating a presynaptic weight corresponding to each of the axons based on values of the synaptic weights between each of the axons and the neurons. An absolute value of each of the postsynaptic weights respectively corresponding to synaptic weights being not "0" from among the synaptic weights is an absolute value or less of a corresponding synaptic weight and a value of each of the postsynaptic weights respectively corresponding to synaptic weights being "0" from among the synaptic weights is "0".

In an embodiment, the absolute value of each of the postsynaptic weights respectively corresponding to the synaptic weights being not "0" may be generated to have "1".

In an embodiment, the presynaptic weight corresponding to each of the axons may be generated to have a value proportional to a value that is obtained by performing root-mean-square on the values of the synaptic weights between each of the axons and the neurons.

The method according to an embodiment of the inventive concepts may further include generating combination weights by multiplying one presynaptic weight of the presynaptic weights and postsynaptic weights corresponding to the one presynaptic weight, and outputting a spike based on the combination weights.

The method according to an embodiment of the inventive concepts may further include updating the decomposed postsynaptic weights based on the output of the spike.

In an embodiment, an update value for the decomposed postsynaptic weights may be determined based on a time to output the spike.

The method according to an embodiment of the inventive concepts may further include updating the decomposed postsynaptic weights based on values of the updated postsynaptic weights.

According to an embodiment of the inventive concepts, a neuromorphic processor includes a synaptic weight decomposing module that decomposes synaptic weights between a first layer including axons and a second layer including neurons into presynaptic weights, a number of which is identical to a number of the axons, and postsynaptic weights, a number of which is identical to a number of the synaptic weights, a first synapse memory that stores the presynaptic weights, and a second synapse memory that stores the postsynaptic weights. A precision of each of the synaptic weights is a first number of bits, a precision of each of the presynaptic weights is a second number of bits, and a precision of each of the postsynaptic weights is a third number of bits. The third number of the bits is smaller than the first number of the bits.

In an embodiment, the synaptic weight decomposing module may generate the postsynaptic weights. An absolute value of each of the postsynaptic weights respectively corresponding to synaptic weights being not "0" from among the synaptic weights is an absolute value or less of a corresponding synaptic weight and a value of each of the postsynaptic weights respectively corresponding to synaptic weights being "0" from among the synaptic weights is "0".

In an embodiment, the absolute value of each of the postsynaptic weights respectively corresponding to the synaptic weights being not "0" is "1".

In an embodiment, the synaptic weight decomposing module may generate a presynaptic weight corresponding to a specific axon of the axons based on values of synaptic weights between the specific axon and the neurons.

In an embodiment, the presynaptic weight corresponding to the specific axon has a value proportional to a value that is obtained by performing root-mean-square on the values of the synaptic weights between the specific axon and the neurons.

The neuromorphic processor according to an embodiment of the inventive concepts may further include an axon module that outputs a spike corresponding to a specific axon of the axons, the first synapse memory may output a presynaptic weight corresponding to the specific axon in response to the spike, and the second synapse memory may output postsynaptic weights corresponding to the specific axon in response to the spike.

The neuromorphic processor according to an embodiment of the inventive concepts may further include a decomposition weight combining module that multiplies the presynaptic weight corresponding to the specific axon and the postsynaptic weights corresponding to the specific axon together to generate combination weights.

The neuromorphic processor according to an embodiment of the inventive concepts may further include a neuron module that receives the combination weights and outputs a spike corresponding to each of the neurons based on a combination weight corresponding to each of the neurons.

In an embodiment, the neuron module may update the postsynaptic weights stored in the second synapse memory based on the output of the spike corresponding to each of the neurons.

In an embodiment, the neuron module may determine an update value for the decomposed postsynaptic weights based on a time to output the spike.

In an embodiment, the neuron module may update the presynaptic weights stored in the first synapse memory based on values of the updated postsynaptic weights.

BRIEF DESCRIPTION OF THE FIGURES

The above and other objects and features of the inventive concepts will become apparent by describing in detail exemplary embodiments thereof with reference to the accompanying drawings.

DETAILED DESCRIPTION

Hereinafter, embodiments of the inventive concepts are described in detail with reference to the accompanying drawings. In the following description, specific details such as detailed components and structures are merely provided to assist the overall understanding of the embodiments of the inventive concepts. Therefore, it should be apparent to those skilled in the art that various changes and modifications of the embodiments described herein may be made without departing from the scope and spirit of the present invention. In addition, descriptions of well-known functions and structures are omitted for clarity and conciseness. The terms described below are terms defined in consideration of the functions in the inventive concepts and are not limited to a specific function. The definitions of the terms should be determined based on the contents throughout the specification.

In the following drawings or in the detailed description, modules may be illustrated in a drawing or may be connected with any other components other than components in the detailed description. Modules or components may be connected directly or indirectly. Modules or components may be connected through communication or may be physically connected.

Components that are described in the detailed description with reference to the terms "unit", "module", "~er or ~or", etc. will be implemented with software, hardware, or a combination thereof. In an embodiment, the software may be a machine code, firmware, an embedded code, and application software. For example, the hardware may include an electrical circuit, an electronic circuit, a processor, a computer, an integrated circuit, integrated circuit cores, a pressure sensor, a microelectromechanical system (MEMS), a passive element, or a combination thereof.

Unless defined differently, all terms used herein, which include technical terminologies or scientific terminologies, have the same meaning as that understood by a person skilled in the art to which the present invention belongs. Terms defined in a generally used dictionary are to be interpreted to have meanings equal to the contextual meanings in a relevant technical field, and are not interpreted to have ideal or excessively formal meanings unless clearly defined in the specification.

Figure 1:
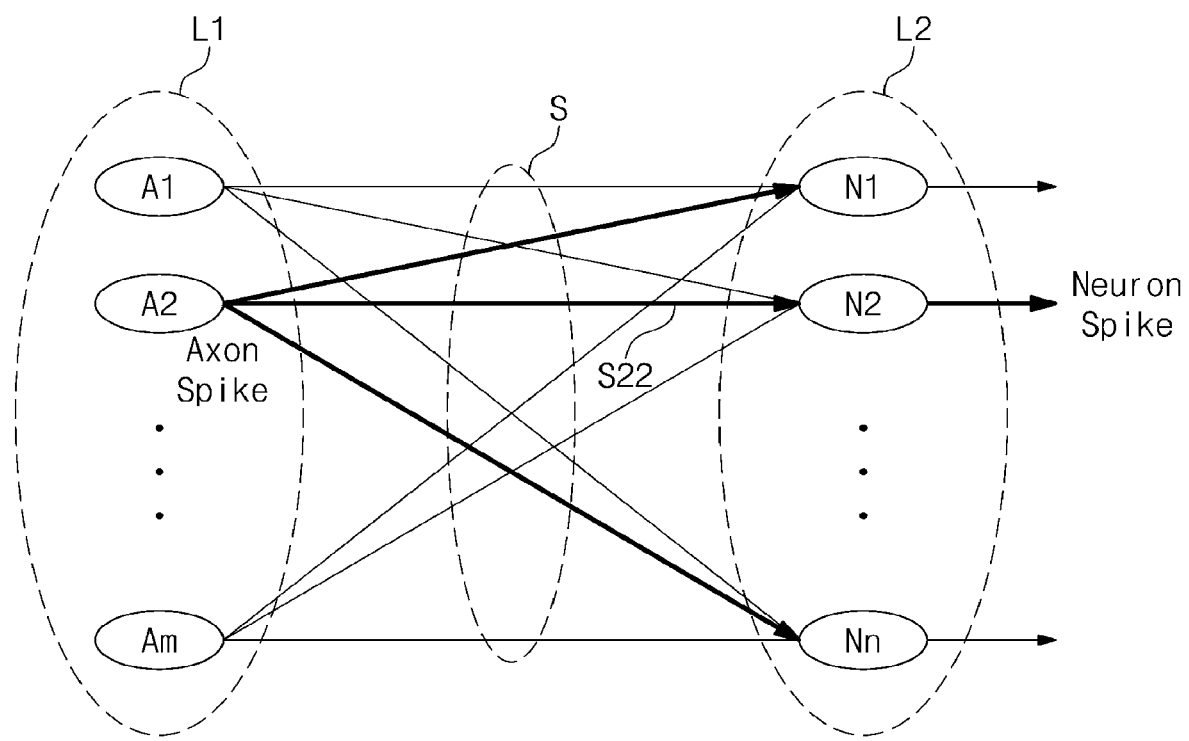
FIG. 1 is a diagram illustrating an example of a neural network according to an embodiment of the inventive concepts.

FIG. 1 is a diagram illustrating an example of a neural network according to an embodiment of the inventive concepts. Referring to FIG. 1, a neural network may include axons A1 to Am, neurons N1 to Nn, and synapses "S". The synapses "S" may connect the axons A1 to Am and the neurons N1 to Nn. The axons A1 to Am may be included in a first layer L1 of the neural network, and the neurons N1 to Nn may be included in a second layer L2 of the neural network. The first layer L1 may include the "m" axons A1 to Am, and the second layer L2 may include the "n" neurons N1 to Nn. Here, "m" and "n" may be any natural number, and "m" and "n" may be different numbers or the same number.

Each of the axons A1 to Am of the first layer L1 may output an axon spike. The synapses "S" may transfer signals to the neurons N1 to Nn of the second layer L2 based on the output axon spike. Even though an axon spike is output from one axon, each of the signals that are transferred from the synapses "S" to the neurons N1 to Nn may vary with a synaptic weight being the connection strength of each of the synapses "S". For example, in the case where a synaptic weight of a first synapse is greater than a synaptic weight of a second synapse, a neuron connected with the first synapse may receive a signal of a greater value than a neuron connected with the second synapse.

The neurons N1 to Nn of the second layer L2 may receive signals transferred from the synapses "S" and may output a neuron spike(s) based on the received signals. In an embodiment, when a value being a result of accumulating received signals is greater than a threshold value, each of the neurons N1 to Nn may output a neuron spike.

For example, as illustrated in FIG. 1, in the case where the second axon A2 outputs an axon spike, the synapses "S" connected with the second axon A2 may transfer signals to the neurons N1 to Nn. The transferred signals may vary with synaptic weights of the synapses "S" connected with the second axon A2. A signal may be transferred to the second neuron N2 from a synapse S22 connecting the second axon A2 and the second neuron N2; in the case where an accumulated signal value of the second neuron N2 becomes greater than the threshold value by the transferred signal, the second neuron N2 may output a neuron spike.

As illustrated in FIG. 1, in embodiments of the inventive concepts, a layer where the axons A1 to Am are included may be a layer prior to a layer where the neurons N1 to Nn are included. Also, the layer where the neurons N1 to Nn are included may be a layer following the layer where the axons A1 to Am are included. Accordingly, signals may be transferred from the neurons N1 to Nn of a next layer based on axon spikes output from the axons A1 to Am, and the neurons N1 to Nn may output neuron spikes based on the transferred signals. That is, the axons A1 to Am may perform a role of transferring signals to the neurons N1 to Nn of the next layer, and the neurons N1 to Nn may perform a role of outputting neuron spikes based on the transferred signals.

Although not illustrated in FIG. 1, as neuron spikes are output from the second layer L2, signals may be transferred to neurons of a next layer (i.e., a third layer). In this case, as neuron spikes are output, axons of the second layer L2 may output axon spikes; signals may be transferred to the neurons of the third layer based on the output axon spikes. The neurons of the third layer may output neuron spikes based on the transferred signals. That is, one layer may include both axons and neurons. However, the inventive concept is not limited thereto. For example, one layer may include either axons or neurons.

An example is illustrated in FIG. 1 as the neural network includes the first layer L1 and the second layer L2, but the inventive concepts is not limited thereto. For example, the number of layers included in the neural network may be variously changed. Regardless of the number of layers, each layer may operate in a manner that is similar to the manner described with reference to FIG. 1. Accordingly, the neural network of FIG. 1 may be expanded to a neural network of various layers.

Figure 2:
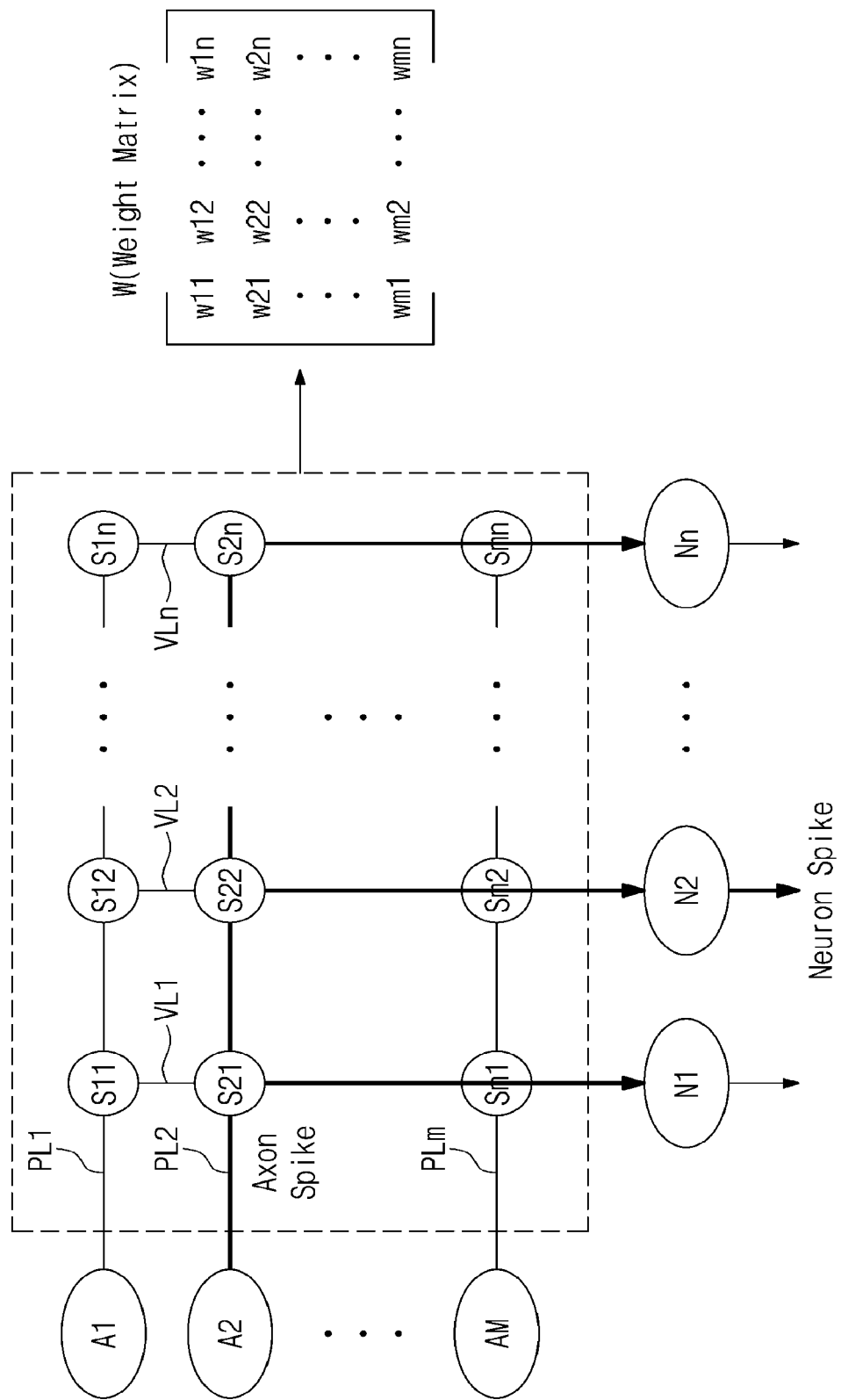
FIG. 2 is a diagram illustrating a connection state of synapses of a neural network of FIG. 1 in the form of an array.

FIG. 2 is a diagram illustrating a connection state of synapses of a neural network of FIG. 1 in the form of an array. Referring to FIG. 2, a neural network may include the axons A1 to Am, the neurons N1 to Nn, and synapses S11 to Smn. The first axon A1 may be connected with the neurons N1 to Nn through the synapses S11 to S1$n$, and the second axon A2 may be connected with the neurons N1 to Nn through the synapses S21 to S2$n$. Likewise, an m-th axon Am may be connected with the neurons N1 to Nn through the synapses Sm1 to Smn.

The first axon A1 may be connected with the synapses S11 to S1$n$ through a first horizontal line PL1, and the second axon A2 may be connected with the synapses S21 to S2$n$ through a second horizontal line PL2. Likewise, the m-th axon Am may be connected with the synapses Sm1 to Smn through an m-th horizontal line PLm. The first neuron N1 may be connected with the synapses S11 to Sm1 through a first vertical line VL1, and the second neuron N2 may be connected with the synapses S12 to Sm2 through a second vertical line VL2. Likewise, the n-th neuron Nn may be connected with the synapses S1$n$ to Smn through an n-th vertical line VLn. One horizontal line may be a signal line through which one axon transfers an axon spike, and one vertical line may be a signal line that synapses transfer a synaptic weight-based signal to one neuron in response to an axon spike.

Each of the m×n synapses S11 to Smn may include a synaptic weight. Synaptic weights w11 to wmn respectively corresponding to the synapses S11 to Smn are illustrated in FIG. 2, and a weight matrix "W" may include the m×n synaptic weights w11 to wmn. That is, the weight matrix "W" may be an m×n matrix.

As illustrated in FIG. 2, in the case where the second axon A2 outputs an axon spike, the axon spike may be transferred to the synapses S21 to S2$n$ through the second horizontal line PL2. In response to the received axon spike, the synapses S21 to S2$n$ may respectively transfer signals to the neurons N1 to Nn based on synaptic weights of the synapses S21 to S2$n$. The signals transferred to the neurons N1 to Nn may be signals respectively corresponding to the synaptic weights. For example, the synapse S22 connecting the second axon A2 and the second neuron N2 may transfer a signal corresponding to the synaptic weight w22 to the second neuron N2. In the case where a signal value accumulated according to the transferred signal is greater than a threshold value stored in advance, the second neuron N2 may output a neuron spike.

In the case of storing the synaptic weights w11 to wmn of FIG. 2 in a memory, the total capacity of the memory necessary to store the synaptic weights w11 to wmn may correspond to a value that is obtained by multiplying the number of synaptic weights and the precision of a synaptic weight together. The precision of a synaptic weight may indicate a range of a synaptic weight value; as the precision of the synaptic weight becomes higher, the number of bits for expressing a synaptic weight may increase. That is, the number of bits is the number of bits indicating a value of each synaptic weight. For example, in the case where the number of synaptic weights w11 to wmn is "m×n" and the precision of each synaptic weight corresponds to "p" bits, the capacity of a memory necessary to store the synaptic weights w11 to wmn may be "m×n X p". In general, because the number of synaptic weights w11 to wmn is great, the capacity of the memory necessary to store the synaptic weights w11 to wmn may be considerably great as the precision of the synaptic weight increases. Accordingly, in the case of storing the synaptic weights w11 to wmn of FIG. 2 without modification, the usage of the memory may become great.

Figure 3:
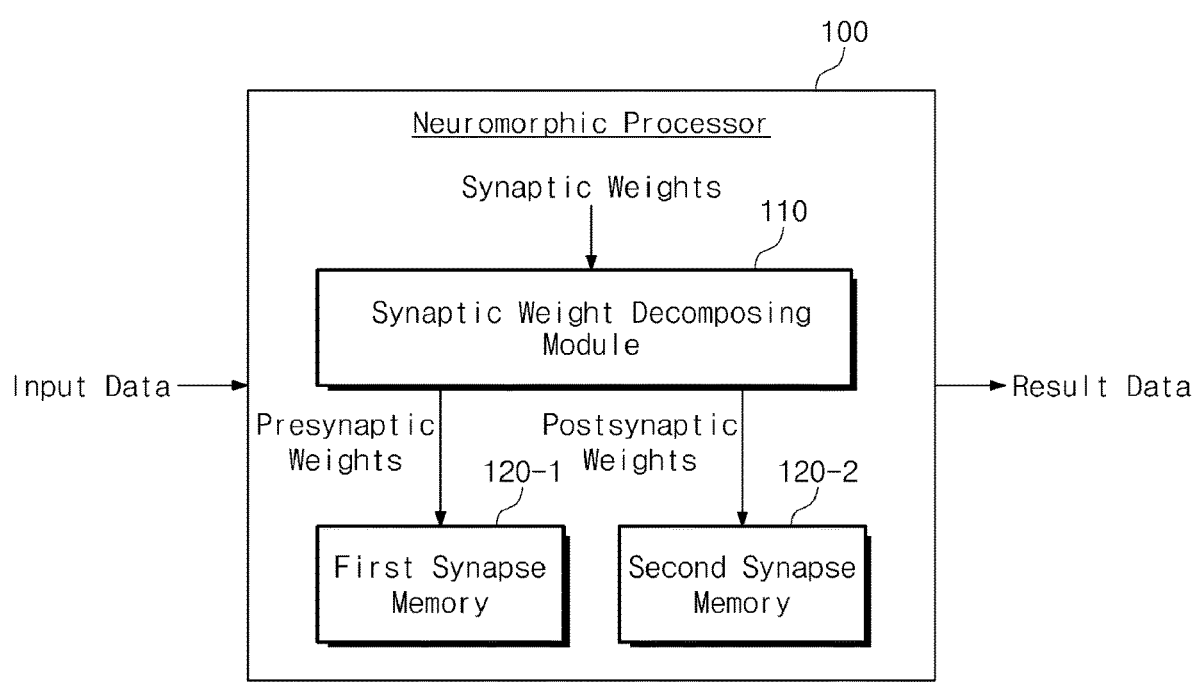
FIG. 3 is a block diagram illustrating a neuromorphic processor according to an embodiment of the inventive concepts.

FIG. 3 is a block diagram illustrating a neuromorphic processor according to an embodiment of the inventive concepts. Referring to FIG. 3, a neuromorphic processor 100 may receive input data and may process the received input data. The neuromorphic processor 100 may output result data that are generated by processing the input data. For example, in the case where the neuromorphic processor 100 is used for character recognition, the input data may include image data, a synaptic weight, and topology data of a neural network, and the result data may include data indicating a specific character determined from the image data and the synaptic weight. That is, the neuromorphic processor 100 may perform learning (e.g. training) based on the input data and may perform inference for determining the result data with regard to the input data.

The neuromorphic processor 100 or components of the neuromorphic processor 100 may be implemented by using hardware, software, firmware, or a combination thereof. For example, the neuromorphic processor 100 or the components of the neuromorphic processor 100 may be implemented on one integrated circuit or separate integrated circuits. The neuromorphic processor 100 may be mounted on an Internet of Things (IoT) sensor, a smartphone, a desktop computer, a server, etc. Also, the neuromorphic processor 100 may be included in a central processing unit (CPU), an application processor (AP), a micro controller unit (or microcontroller) (MCU), an accelerator, etc. However, the inventive concepts is not limited thereto. For example, the neuromorphic processor 100 may be in the form of a separate chip.

The neuromorphic processor 100 may include a synaptic weight decomposing module 110, a first synapse memory 120-1, and a second synapse memory 120-2. The synaptic weight decomposing module 110 may decompose synaptic weights into presynaptic weights and postsynaptic weights. The synaptic weights may be data that are included in the input data and are provided to neuromorphic processor 100. In an embodiment, the precision (i.e., the number of bits) of each synaptic weight may correspond to "p" bits, the precision (i.e., the number of bits) of each presynaptic weight may correspond to "k" bits, and the precision (i.e., the number of bits) of each postsynaptic weight may correspond to "q" bits. In this case, the precision of the postsynaptic weight may be lower than the precision of the synaptic weight. That is, "q" may be smaller than "p", and the postsynaptic weight may be expressed by using bits, the number of which is smaller than the number of bits of the synaptic weight.

Alternatively, in the case where the numbers of bits necessary to express respective synaptic weights are different, the synaptic weight decomposing module 110 may decompose synaptic weights such that each of postsynaptic weights is expressed by using bits, the number of which is smaller than the greatest number of bits from among the numbers of bits for expressing synaptic weights.

As illustrated in FIG. 2, in the case where the synaptic weights w11 to wmn are provided, the synaptic weight decomposing module 110 may decompose the synaptic weights w11 to wmn into the presynaptic weights and the postsynaptic weights. The number of presynaptic weights generated as a result of the decomposition may be identical to the number of the axons A1 to Am, that is, "m", and the number of postsynaptic weights generated as a result of the decomposition may be identical to the number of the synaptic weights w11 to wmn, that is, "m×n". That is, in the case where the m×n weight matrix "W" of FIG. 2 is provided, the synaptic weight decomposing module 110 may decompose the weight matrix "W" into a first sub-weight matrix being an "m×1" matrix and a second sub-weight matrix being an "m×n" matrix.

The presynaptic weights generated from the synaptic weight decomposing module 110 may be stored in the first synapse memory 120-1, and the postsynaptic weights generated from the synaptic weight decomposing module 110 may be stored in the second synapse memory 120-2.

In the case where the synaptic weight decomposing module 110 decomposes the "m×n" synaptic weights to generate "m" presynaptic weights expressed by "k" bits and "m×n" postsynaptic weights expressed by "q" bits, a capacity of the first synapse memory 120-1 necessary to store the presynaptic weights may be "m×k", and a capacity of the second synapse memory 120-2 necessary to store the postsynaptic weights may be "m×n×q". Accordingly, the total available capacity of the first synapse memory 120-1 and the second synapse memory 120-2 may be "(m×k)+(m×n×q)". In general, because the number (i.e., "m") of axons of a neural network and the number (i.e., "n") of neurons of the neural network are considerably greater than numbers (i.e., "p", "k", and "q") each indicating the number of bits, the capacity (m×k) of the first synapse memory 120-1 may be ignorable with regard to the total memory capacity of "(m×k)+(m×n×q)", and the total memory capacity to be used may be about "m×n X q".

As described with reference to FIG. 2, a memory capacity necessary to store "m×n" synaptic weights expressed by "p" bits may be "m×n X p". Because "q" being the number of bits of a postsynaptic weight is smaller than "p" being the number of bits of a synaptic weight, "m×n×q" is smaller than "m×n×p". Accordingly, a memory capacity that is used after synaptic weights are decomposed may be smaller than a memory capacity that is used before synaptic weights are decomposed. Also, because the precision of a presynaptic weight compensate a low precision of a postsynaptic weight, even though synaptic weights are decomposed, the accuracy of the neuromorphic processor 100 may not decrease. That is, the neuromorphic processor 100 according to embodiments of the inventive concepts may decompose synaptic weights into presynaptic weights and postsynaptic weights, thus reducing usage of a memory while maintaining the accuracy for data operation and processing.

Figure 4:
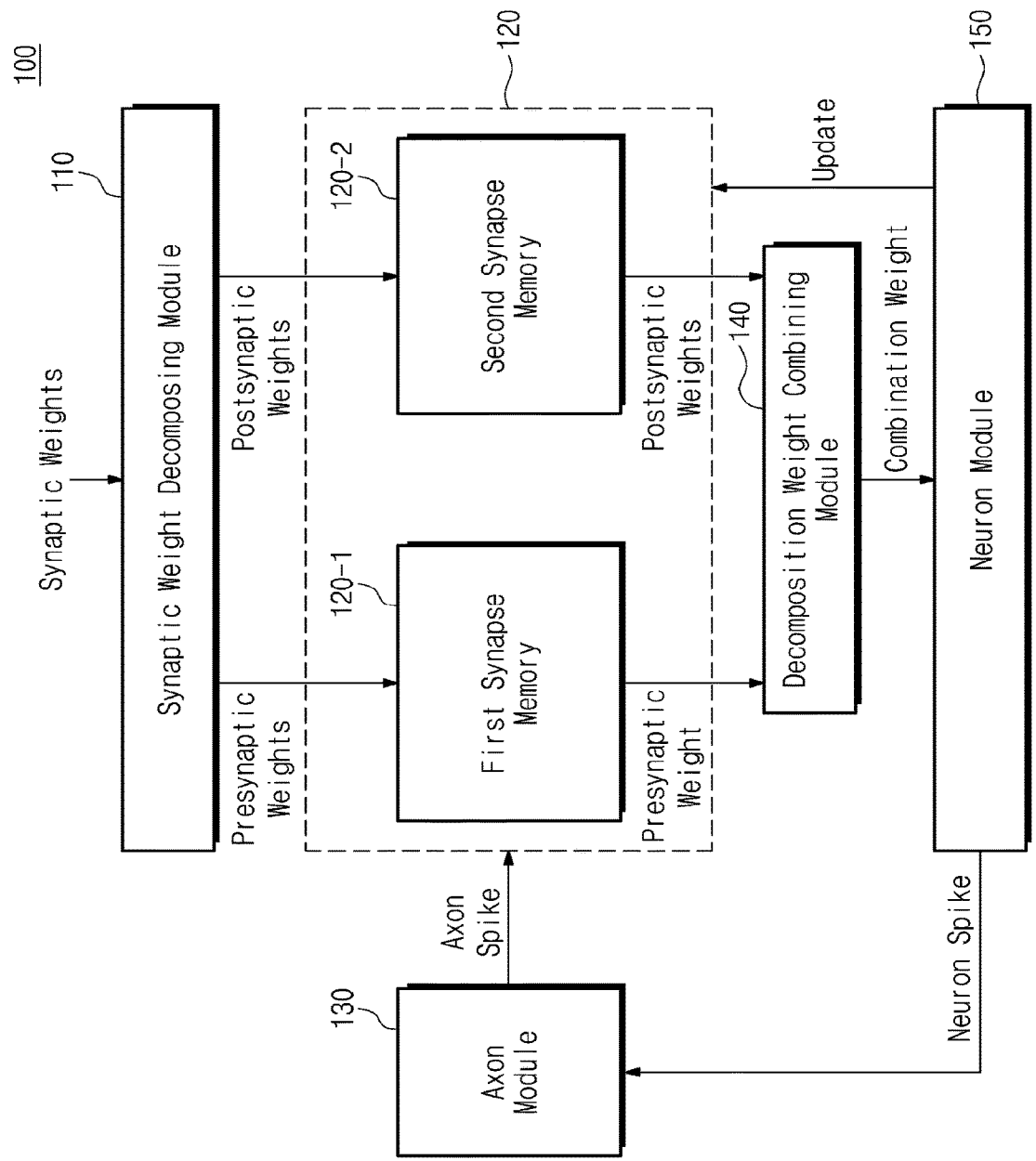
FIG. 4 is a block diagram illustrating a neuromorphic processor of FIG. 3 in detail.

FIG. 4 is a block diagram illustrating a neuromorphic processor of FIG. 3 in detail. Referring to FIG. 4, the neuromorphic processor 100 may include the synaptic weight decomposing module 110, the first synapse memory 120-1, the second synapse memory 120-2, an axon module 130, a decomposition weight combining module 140, and a neuron module 150. Operations of the synaptic weight decomposing module 110, the first synapse memory 120-1, and the second synapse memory 120-2 of FIG. 4 are similar to the operations of the synaptic weight decomposing module 110, the first synapse memory 120-1, and the second synapse memory 120-2 of FIG. 3, and thus, additional description will be omitted to avoid redundancy.

The synaptic weight decomposing module 110 may decompose synaptic weights expressed by "p" bits into presynaptic weights expressed by "k" bits and postsynaptic weights expressed by "q" bits. In the case where synaptic weights between a first layer including axons and a second layer including neurons are decomposed, the number of presynaptic weights may be identical to the number of axons, and the number of postsynaptic weights may be identical to the number of synaptic weights (i.e., the number of synapses). Also, "q" being the number of bits of a postsynaptic weight may be smaller than "p" being the number of bits of a synaptic weight.

The first synapse memory 120-1 may store presynaptic weights provided from the synaptic weight decomposing module 110. The second synapse memory 120-2 may store postsynaptic weights provided from the synaptic weight decomposing module 110.

Each of the first synapse memory 120-1 and the second synapse memory 120-2 may be implemented with one of a volatile memory device, such as a static random access memory (SRAM), a dynamic RAM (DRAM), or a synchronous DRAM (SDRAM), and a nonvolatile memory device, such as a read only memory (ROM), a programmable ROM (PROM), an electrically programmable ROM (EPROM), an electrically erasable and programmable ROM (EEPROM), a phase-change RAM (PRAM), a magnetic RAM (MRAM), a resistive RAM (RRAM), a ferroelectric RAM (FRAM), or a flash memory. As illustrated in FIG. 4, the first synapse memory 120-1 and the second synapse memory 120-2 may be included in one synapse memory 120, but the inventive concepts is not limited thereto. For example, the first synapse memory 120-1 and the second synapse memory 120-2 may be implemented with separate memories, respectively.

The axon module 130 may output an axon spike corresponding to a specific axon from among axons to the synapse memory 120. In response to the axon spike, the synapse memory 120 may output a presynaptic weight corresponding to the specific axon from the first synapse memory 120-1 and may output postsynaptic weights corresponding to the specific axon from the second synapse memory 120-2. Presynaptic weights stored in the first synapse memory 120-1 may respectively correspond to axons, and thus, one presynaptic weight corresponding to the specific axon may be output.

Postsynaptic weights stored in the second synapse memory 120-2 may respectively correspond to synapses connecting axons and neurons. This means that postsynaptic weights corresponding to the specific axon exist as much as the number of synapses connecting the specific axon and the neurons. For example, in the case where "m×n" postsynaptic weights are stored in the second synapse memory 120-2, the number of postsynaptic weights corresponding to the specific axon may be "n".

The axon module 130 may receive a neuron spike output from the neuron module 150. The axon module 130 may output an axon spike (or axon spikes) corresponding to at least one (or two axons) of axons in response to the neuron spike. For example, in the case where the number of neurons is identical to the number of axons and a neuron spike is output from a specific neuron, the axon module 130 may determine an axon corresponding to the specific neuron and may output an axon spike corresponding to the determined axon. That is, the axon module 130 may in advance store correspondence information between one neuron and a corresponding axon and may output an axon spike based on the stored correspondence information when a neuron spike is received.

The decomposition weight combining module 140 may receive a presynaptic weight output from the first synapse memory 120-1 and postsynaptic weights output from the second synapse memory 120-2. The decomposition weight combining module 140 may generate combination weights by multiplying the presynaptic weight and the postsynaptic weights together. A combination weight may be a value that is obtained by multiplying a presynaptic weight and a relevant postsynaptic weight together. This means that the number of combination weights is identical to the number of postsynaptic weights and the combination weights correspond to neurons, respectively.

Because a combination weight is a value obtained by multiplying a presynaptic weight and a postsynaptic weight, the number of bits of a combination weight may be greater than the number of bits of a presynaptic weight or the number of bits of a postsynaptic weight. For example, in the case where the number of bits of a presynaptic weight is "k" and the number of bits of a postsynaptic weight is "q", the number of bits of a combination weight may be "(k+q)" bits. The generated combination weights may be provided to the neuron module 150, and thus, the neuron module 150 may perform an operation based on a combination weight of high precision. Because the neuron module 150 operates based on a combination weight of high precision, the neuromorphic processor 100 may maintain precision in operating and processing data.

The neuron module 150 may receive combination weights. The neuron module 150 may output a neuron spike corresponding to each neuron based on a combination weight corresponding to each neuron. For example, the neuron module 150 may increase or decrease a signal value corresponding to a specific neuron based on a combination weight. In the case where a signal value is greater than a threshold value stored in advance, the neuron module 150 may output a neuron spike corresponding to the specific neuron. The neuron spike output from the neuron module 150 may be provided to the axon module 130.

The neuron module 150 may output an update signal based on whether a neuron spike is output. The second synapse memory 120-2 may update values of stored postsynaptic weights in response to the update signal. For example, in the case where a neuron spike corresponding to a specific neuron is output, the neuron module 150 may output the update signal for updating weights corresponding to synapses connected to the specific neuron. The second synapse memory 120-2 may update postsynaptic weights corresponding to the synapses connected to the specific neuron in response to the update signal. In the case where "m×n" postsynaptic weights are stored, the second synapse memory 120-2 may update "m" postsynaptic weights corresponding to the specific neuron.

Alternatively, in response to the update signal of the neuron module 150, the first synapse memory 120-1 may update presynaptic weights. Specifically, the neuron module 150 may determine the number of weights greater than a given value from among updated postsynaptic weights. In the case where the number of postsynaptic weights greater than the given value is greater than a given number, the neuron module 150 may update presynaptic weights and postsynaptic weights. Here, the given value may vary with the precision (i.e., the number of bits) of a postsynaptic weight, and the given number may vary with the total number of postsynaptic weights (i.e., the total number of synaptic weights). Accordingly, the number of times that presynaptic weights are updated may be less than the number of times that postsynaptic weights are updated.

In the case where the neuromorphic processor 100 performs learning on input data, postsynaptic weights may be updated according to the update signal from the neuron module 150. In the case where only postsynaptic weights are updated in the learning operation, the total number of times of an access to the synapse memory 120 may decrease, and thus, an update operation may be quickly performed.

In the case where the neuromorphic processor 100 performs inference on input data, the neuromorphic processor 100 may not output the update signal. The neuromorphic processor 100 may output result data based on a neuron spike output from the neuron module 150.

Figure 5:
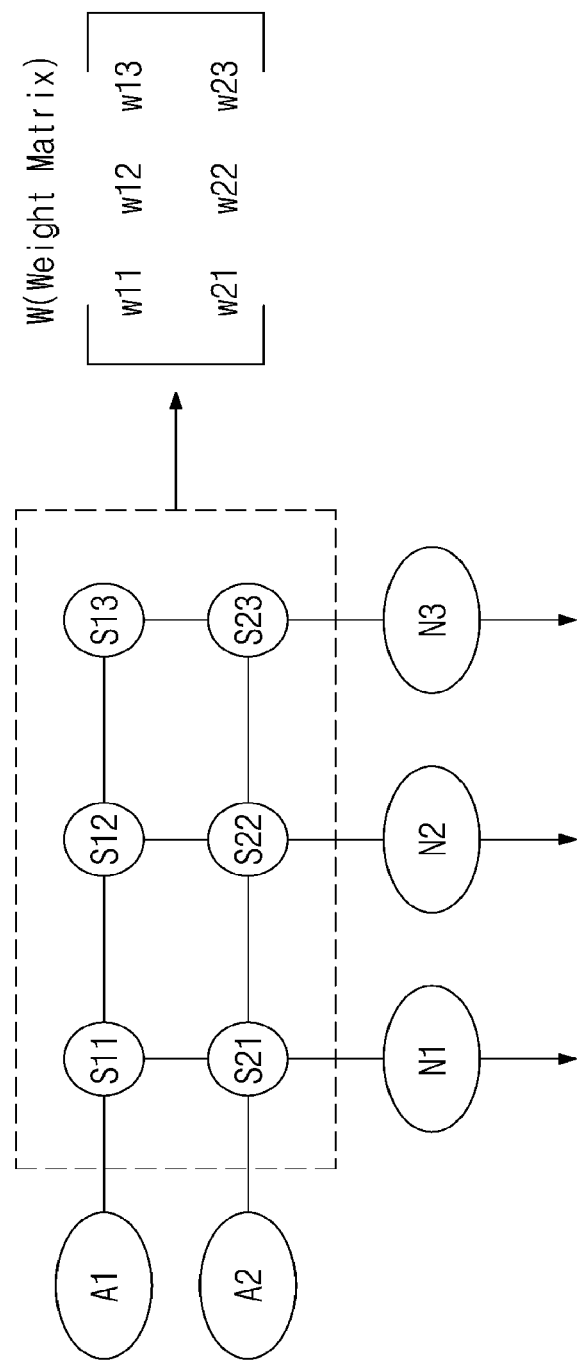
FIG. 5 is a diagram illustrating an example of a neural network according to an embodiment of the inventive concepts.

FIG. 5 is a diagram illustrating an example of a neural network according to an embodiment of the inventive concepts. Referring to FIG. 5, a neural network may include the first and second axons A1 and A2, the first to third neurons N1 to N3, and synapses S11 to S23. The first axon A1 may be connected with the first to third neurons N1 to N3 through the synapses S11 to S13, and the second axon A2 may be connected with the first to third neurons N1 to N3 through the synapses S21 to S23. Synaptic weights w11 to w23 of the weight matrix "W" may indicate the connection strengths of the synapses S11 to S23. That is, the neural network of FIG. 5 may include "2×3" synaptic weights w11 to w23.

Below, an operation of the neuromorphic processor 100 of FIG. 4 will be more fully described with reference to the neural network of FIG. 5. However, the inventive concepts is not limited to the neural network of FIG. 5. For example, the neuromorphic processor 100 of the inventive concepts may be applied to various neural networks.

Figure 6:
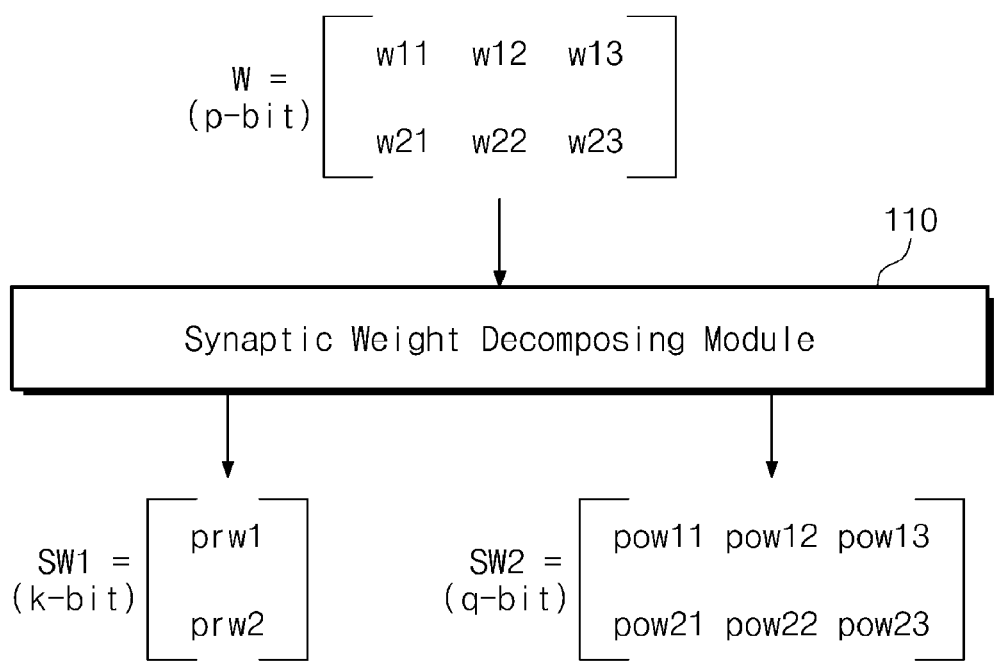
FIG. 6 is a diagram illustrating an operation of a synaptic weight decomposing module of FIG. 4.

FIG. 6 is a diagram illustrating an operation of a synaptic weight decomposing module of FIG. 4. The synaptic weight decomposing module 110 may decompose six synaptic weights w11 to w23 into two presynaptic weights prw1 and prw2 and six postsynaptic weights pow11 to pow23. That is, the synaptic weight decomposing module 110 may decompose the "2×3" weight matrix "W" into a first sub-weight matrix SW1 being a "2×1" matrix and a second sub-weight matrix SW2 being a "2×3" matrix.

Each of the synaptic weights w11 to w23 may be expressed by "p" bits, each of the presynaptic weights prw1 and prw2 may be expressed by "k" bits, and each of the postsynaptic weights pow11 to pow23 may be expressed by "q" bits. Here, "q" being the number of bits of a postsynaptic weight may be smaller than "p" being the number of bits of a synaptic weight.

The synaptic weight decomposing module 110 may generate the presynaptic weights prw1 and prw2, the number of which is identical to the number of axons A1 and A2 of FIG. 5. As such, the presynaptic weight prw1 may correspond to the first axon A1, and the presynaptic weight prw2 may correspond to the second axon A2.

The synaptic weight decomposing module 110 may generate the postsynaptic weights pow11 to pow23, the number (i.e., 6) of which is identical to the number of synaptic weights w11 to w23 or synapses S11 and S23 of FIG. 5. The postsynaptic weights pow11 to pow13 at the first row of the second sub-weight matrix SW2 may correspond to the first axon A1, and the postsynaptic weights pow21 to pow23 at the second row of the second sub-weight matrix SW2 may correspond to the second axon A2.

For example, in the case where the weight matrix "W" is as follow, $$W = \begin{bmatrix} 0 & 1 & 2 \\ 2 & 4 & 0 \end{bmatrix}$$

the synaptic weight decomposing module 110 may decompose the weight matrix "W" illustrated above the synaptic weight decomposing module 110 into the first sub-weight matrix SW1 and the second sub-weight matrix SW2 illustrated below the synaptic weight decomposing module 110.

$$SW1 = \begin{bmatrix} 1 \\ 3 \end{bmatrix}$$

$$SW2 = \begin{bmatrix} 0 & 1 & 1 \\ 1 & 1 & 0 \end{bmatrix}$$

In this case, each synaptic weight may be expressed by three bits, each presynaptic weight may be expressed by two bits, and each postsynaptic weight may be expressed by one bit. The number (i.e., 1) of bits of a postsynaptic weight may be smaller than the number (i.e., 3) of bits of a synaptic weight.

The synaptic weight decomposing module 110 may generate an absolute value of each of postsynaptic weights respectively corresponding to synaptic weights being not "0" from among synaptic weights, so as to have an absolute value or less of a corresponding synaptic weight and may generate a value of each of postsynaptic weights respectively corresponding to synaptic weights being "0" from among the synaptic weights so as to have "0". For example, the synaptic weight decomposing module 110 may generate an absolute value of each of postsynaptic weights respectively corresponding to synaptic weights being not "0", so as to have "1".

The synaptic weight decomposing module 110 may generate a presynaptic weight corresponding to one axon based on values of synaptic weights between one axon and neurons. For example, the synaptic weight decomposing module 110 may generate the presynaptic weight prw1 corresponding to the first axon A1 so as to be proportional to a value obtained by performing a root-mean-square operation on values (i.e., 0, 1, and 2) of the synaptic weights w11, w12, and w13 between the first axon A1 and the neurons N1 to N3. However, the inventive concepts is not limited thereto. For example, the synaptic weight decomposing module 110 may generate a presynaptic weight based on various methods.

The above weight matrix "W" includes synaptic weights of positive values, but the inventive concepts is not limited thereto. For example, the weight matrix "W" may include synaptic weights of negative values. In this case, a presynaptic weight of a negative value and a postsynaptic weight of a negative value may be generated.

Figure 7:
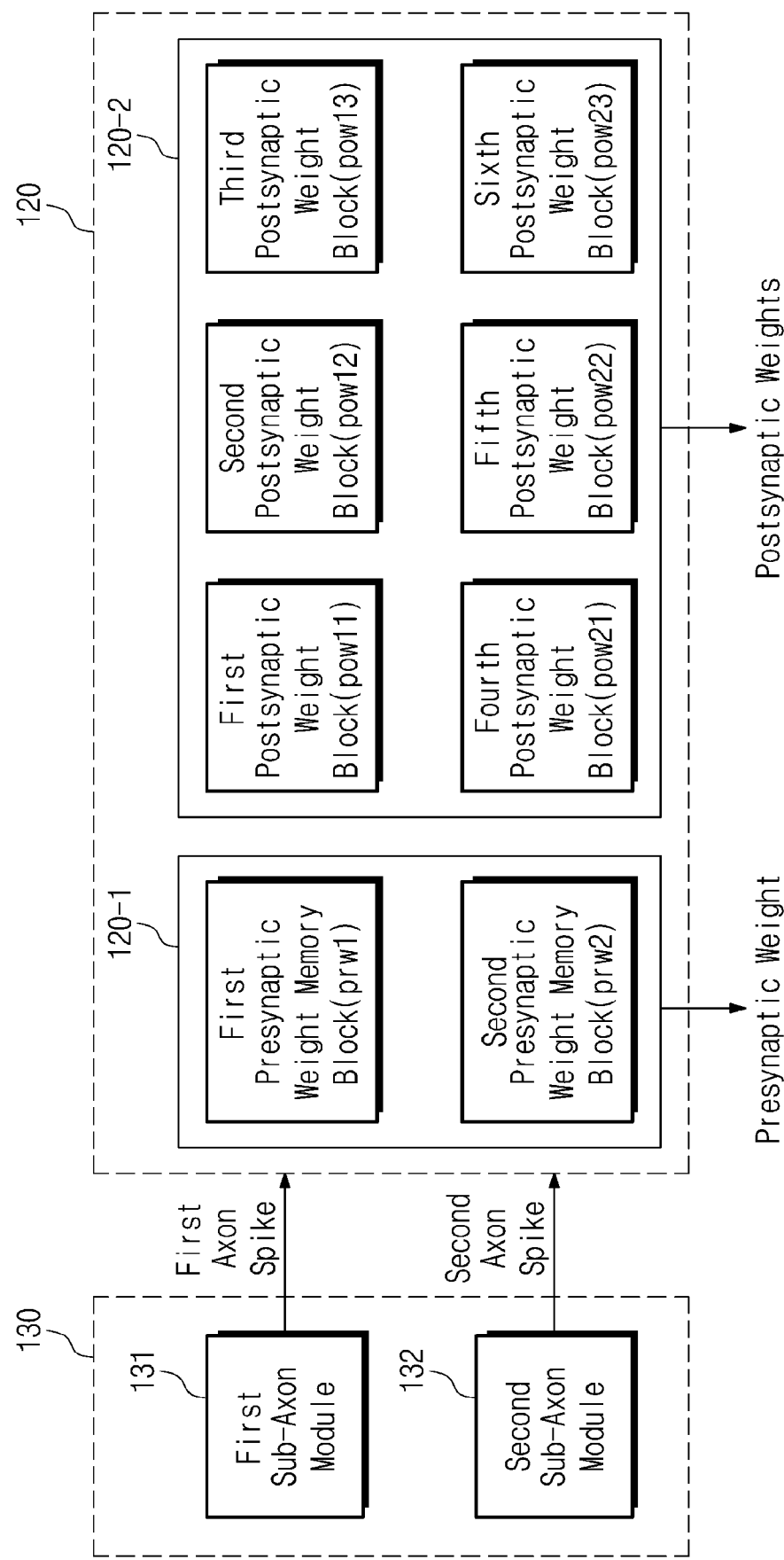
FIG. 7 is a diagram illustrating an operation of an axon module of FIG. 4.

FIG. 7 is a diagram illustrating an operation of an axon module of FIG. 4. Referring to FIG. 7, the axon module 130 may include a first sub-axon module 131 and a second sub-axon module 132. The first sub-axon module 131 may correspond to the first axon A1 of FIG. 5, and the second sub-axon module 132 may correspond to the second axon A2 of FIG. 5. The first sub-axon module 131 may output a first axon spike, and the second sub-axon module 132 may output a second axon spike. An axon spike output from the axon module 130 may be provided to the synapse memory 120.

The synapse memory 120 may include the first synapse memory 120-1 and the second synapse memory 120-2. The first synapse memory 120-1 may include a first presynaptic memory block and a second presynaptic memory block. Each of the presynaptic memory blocks may include one or more memory cells. The first presynaptic memory block may store the presynaptic weight prw1, and the second presynaptic memory block may store the presynaptic weight prw2. The presynaptic weights prw1 and prw2 may be provided from the synaptic weight decomposing module 110 of FIG. 6. The presynaptic weight prw1 stored in the first presynaptic memory block may correspond to the first axon A1 of FIG. 5, and the presynaptic weight prw2 stored in the second presynaptic memory block may correspond to the second axon A2 of FIG. 5.

The second synapse memory 120-2 may include first to sixth postsynaptic memory blocks. Each of the postsynaptic memory blocks may include one or more memory cells. The first postsynaptic memory block may store the postsynaptic weight pow11. Likewise, the second to sixth postsynaptic memory blocks may store corresponding postsynaptic weights pow12 to pow23, respectively. The postsynaptic weights pow11 to pow13 stored in the first to third postsynaptic memory blocks may correspond to the first axon A1 of FIG. 5, and the postsynaptic weights pow21 to pow23 stored in the fourth to sixth postsynaptic memory blocks may correspond to the second axon A2 of FIG. 5.

The first synapse memory 120-1 may output a presynaptic weight in response to an axon spike provided from the axon module 130. For example, the first synapse memory 120-1 may output the presynaptic weight prw1 stored in the first presynaptic memory block in response to the first axon spike. Alternatively, the first synapse memory 120-1 may output the presynaptic weight prw2 stored in the second presynaptic memory block in response to the second axon spike.

The second synapse memory 120-2 may output relevant postsynaptic weights in response to an axon spike provided from the axon module 130. For example, the second synapse memory 120-2 may output the postsynaptic weights pow11 to pow13 stored in the first to third postsynaptic memory blocks in response to the first axon spike. Alternatively, the second synapse memory 120-2 may output the postsynaptic weights pow21 to pow23 stored in the fourth to sixth postsynaptic memory blocks in response to the second axon spike.

As described above, the first synapse memory 120-1 and the second synapse memory 120-2 may output a presynaptic weight and postsynaptic weights corresponding to a specific axon (i.e., a specific axon module) from among axons in response to an axon spike output from the specific axon.

Figure 8:
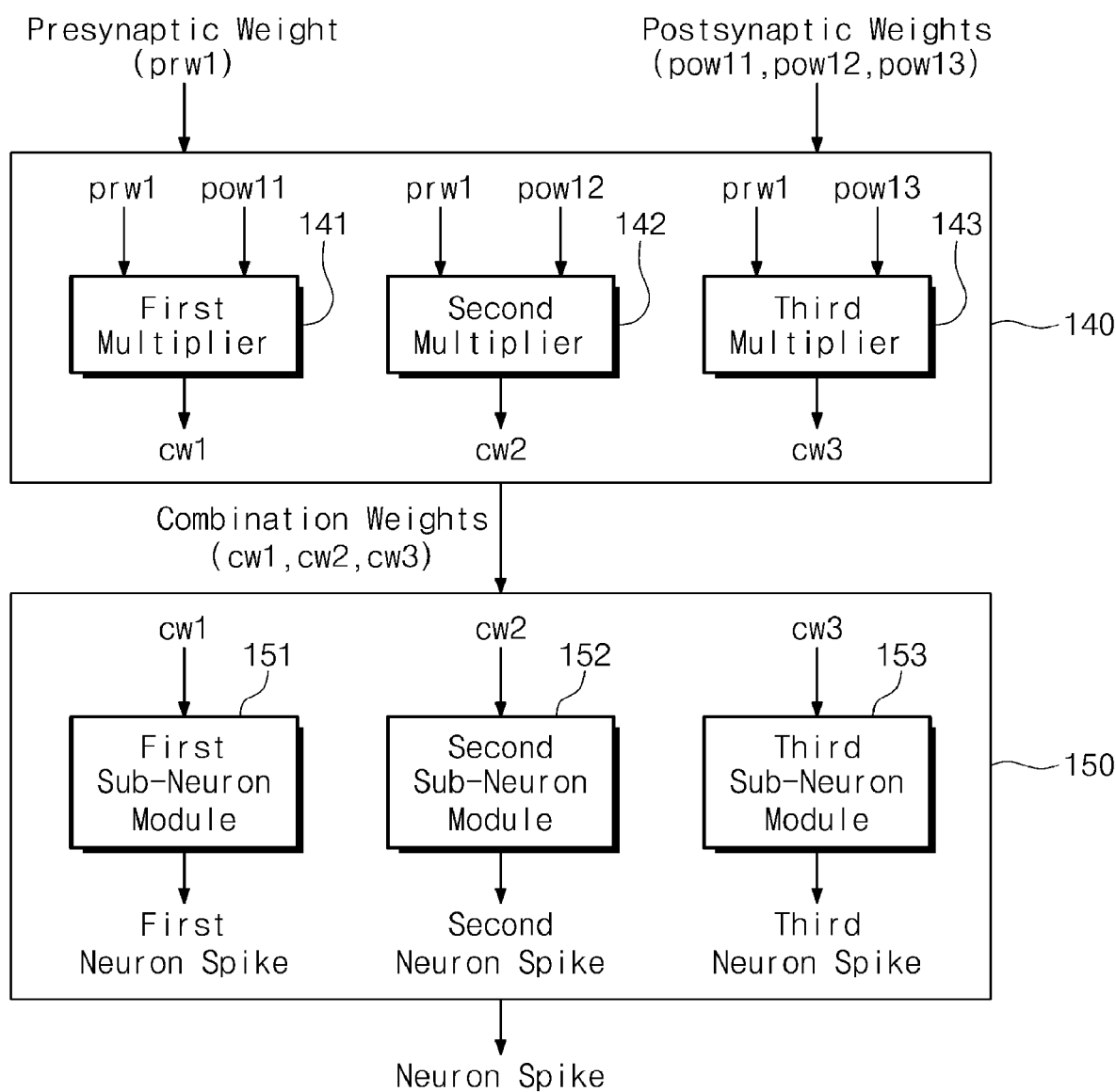
FIG. 8 is a diagram illustrating an operation of a decomposition weight combining module and a neuron module of FIG. 4.

FIG. 8 is a diagram illustrating an operation of a decomposition weight combining module and a neuron module of FIG. 4. Referring to FIG. 8, the decomposition weight combining module 140 may receive a presynaptic weight and postsynaptic weights from the synapse memory 120 of FIG. 7. For example, in the case where the synapse memory 120 outputs the presynaptic weight prw1 and the postsynaptic weights pow11, pow12, and pow13, in response to a first axon spike, the decomposition weight combining module 140 may receive the presynaptic weight prw1 and the postsynaptic weights pow11, pow12, and pow13. However, the inventive concept is not limited thereto. For example, the decomposition weight combining module 140 may receive the presynaptic weight prw2 and the postsynaptic weights pow21, pow22, and pow23. For convenience of description, below, an operation of the decomposition weight combining module 140 will be described with reference to an example in which the presynaptic weight prw1 and the postsynaptic weights pow11, pow12, and pow13.

The decomposition weight combining module 140 may include a first multiplier 141, a second multiplier 142, and a third multiplier 143. The decomposition weight combining module 140 may generate combination weights cw1, cw2, and cw3 by using the first to third multipliers 141 to 143. The first multiplier 141 may generate the combination weight cw1 by multiplying the presynaptic weight prw1 and the postsynaptic weight pow11. The second multiplier 142 may generate the combination weight cw2 by multiplying the presynaptic weight prw1 and the postsynaptic weight pow12. The third multiplier 143 may generate the combination weight cw3 by multiplying the presynaptic weight prw1 and the postsynaptic weight pow13. For example, in the case where the presynaptic weight prw1 is "3" and the postsynaptic weights pow11, pow12, and pow13, are "1", "1", and "0", respectively, the combination weights cw1, cw2, and cw3 may be "3", "3", and "0". The decomposition weight combining module 140 may provide the generated combination weights cw1, cw2, and cw3 to the neuron module 150.

The combination weights cw1, cw2, and cw3 that are generated based on the presynaptic weight prw1 and the postsynaptic weights pow11, pow12, and pow13 may correspond to the first axon A1 of FIG. 5. The combination weight cw1 may correspond to the synaptic weight w11 between the first axon A1 and the first neuron N1 of FIG. 5. The combination weight cw2 may correspond to the synaptic weight w12 between the first axon A1 and the second neuron N2 of FIG. 5. The combination weight cw3 may correspond to the synaptic weight w13 between the first axon A1 and the third neuron N3 of FIG. 5. Values of the combination weights cw1, cw2, and cw3 may be identical to or different from values of the corresponding synaptic weights w11, w12, and w13. That is, a value of a generated combination weight may be different from a corresponding synaptic weight, and a difference of the value may be within a given range. As such, even though the neuromorphic processor 100 operates based on a combination weight, the operation of the neuromorphic processor 100 may be similar to an operation of the neuromorphic processor 100 based on a synaptic weight.

The neuron module 150 may output a neuron spike based on the combination weights cw1, cw2, and cw3. The neuron module 150 may include a first sub-neuron module 151, a second sub-neuron module 152, and a third sub-neuron module 153. The first to third sub-neuron modules 151 to 153 may correspond to the first to third neurons N1 to N3 of FIG. 5, respectively.

The first to third sub-neuron modules 151 to 153 may receive the corresponding combination weights cw1, cw2, and cw3 and may output a neuron spike based on the combination weights cw1, cw2, and cw3. For example, the first sub-neuron module 151 may output a neuron spike based on the combination weight cw1. Likewise, the second sub-neuron module 153 and the third sub-neuron module 153 may output a second neuron spike and a third neuron spike, respectively. A neuron spike output from the neuron module 150 may include at least one of the first to third neuron spikes.

Each of the first to third sub-neuron modules 151 to 153 may receive the corresponding combination weight and may accumulate and store a signal value corresponding to the combination weight. The first to third sub-neuron modules 151 to 153 may sequentially receive the corresponding combination weights and may accumulate and store signal values respectively corresponding to the combination weights. For example, before the first sub-neuron module 151 receives the combination weight cw1, the first sub-neuron module 151 may include an accumulated signal value corresponding to the received combination weights. In the case where the first sub-neuron module 151 receives the combination weight cw1, the first sub-neuron module 151 may add a signal value corresponding to the combination weight cw1 to an existing accumulated signal value.

In the case where a signal value accumulated according to the received combination weight is greater than a threshold value, each of the first to third sub-neuron modules 151 to 153 may output a neuron spike. For example, the first sub-neuron module 151 may accumulate a signal value corresponding to the received combination weight cw1; when the accumulated signal value is greater than the threshold value, the first sub-neuron module 151 may output the first neuron spike. After the first sub-neuron module 151 outputs the first neuron spike, the first sub-neuron module 151 may initialize the accumulated signal value.

As described above, the neuron module 150 may output a neuron spike based on combination weights. The learning or inference operation of the neuromorphic processor 100 may be performed based on a neuron spike output from the neuron module 150. For example, the neuromorphic processor 100 may output a determination result of character recognition as result data, based on the output neuron spike.

Figure 9:
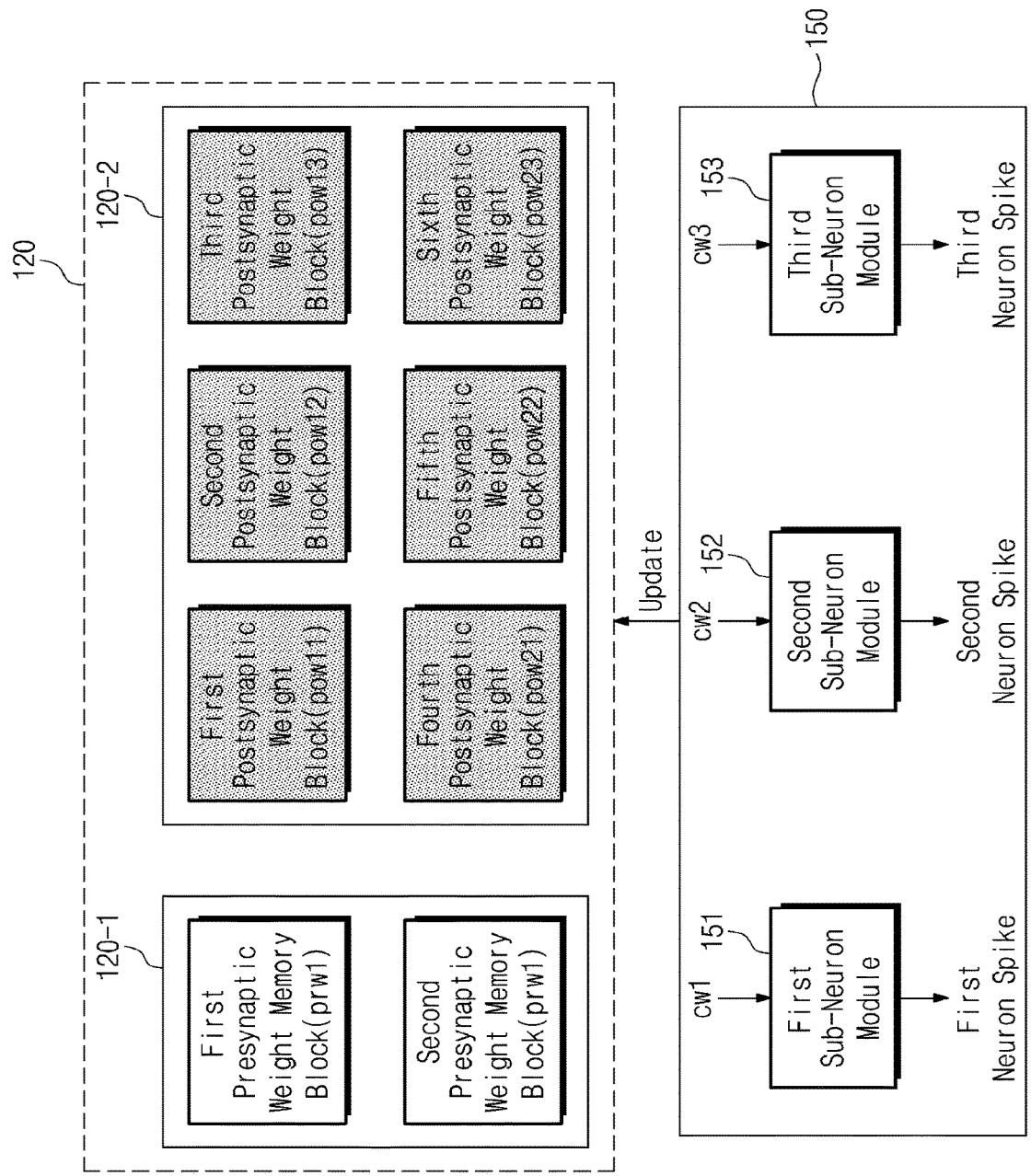
FIG. 9 is a diagram illustrating an update operation of a neuron module of FIG. 4.

FIG. 9 is a diagram illustrating an update operation of a neuron module of FIG. 4. Referring to FIG. 9, the synapse memory 120 may include the first synapse memory 120-1 and the second synapse memory 120-2. The first synapse memory 120-1 may include the first and second presynaptic memory blocks, and the second synapse memory 120-2 may include the first to sixth postsynaptic memory blocks. The presynaptic weights prw1 and prw2 may be respectively stored in the corresponding presynaptic memory blocks, and the postsynaptic weights pow11 to pow23 may be respectively stored in the corresponding postsynaptic memory blocks.

The neuron module 150 may include the first to third sub-neuron modules 151 to 153. Each of the first to third sub-neuron modules 151 to 153 may output a neuron spike based on the corresponding combination weight, as described with reference to FIG. 8. For example, the first sub-neuron module 151 may output a first neuron spike based on the combination weight cw1.

In the learning operation, the neuron module 150 may provide the update signal to the synapse memory 120 when a neuron spike is output. The synapse memory 120 may update values of stored weights in response to the update signal. In an embodiment, in response to the update signal, the second synapse memory 120-2 may update stored postsynaptic weights. In the case where a presynaptic weight is not updated and only postsynaptic weights are updated, an operation of updating a weight may be quickly performed. However, the inventive concepts is not limited thereto. For example, the synapse memory 120 may update a presynaptic weight stored in the first synapse memory 120-1.

For example, the neuron module 150 may determine the number of weights greater than a given value from among updated postsynaptic weights. In the case where the number of postsynaptic weights greater than the given value is greater than a given number, the neuron module 150 may update presynaptic weights and postsynaptic weights. Here, the given value may vary with the precision (i.e., the number of bits) of a postsynaptic weight, and the given number may vary with the total number of postsynaptic weights (i.e., the total number of synaptic weights). Accordingly, the number of times that presynaptic weights are updated may be less than the number of times that postsynaptic weights are updated.

For example, the neuron module 150 may output the update signal when a first neuron spike is output. The update signal according to the output of the first neuron spike may be an update signal associated with the postsynaptic weights pow11 and pow21 stored in the first and fourth postsynaptic memory blocks. Likewise, the neuron module 150 may output an update signal associated with the postsynaptic weights pow12 and pow22 stored in the second and fifth postsynaptic memory blocks when a second neuron spike is output, and may output an update signal associated with the postsynaptic weights pow13, and pow23 stored in the third and sixth postsynaptic memory blocks when a third neuron spike is output. That is, when a neuron spike corresponding to a specific neuron is output, postsynaptic weights corresponding to the specific neuron may be updated.

In an embodiment, the neuron module 150 may provide an address where a weight to be updated is stored and a value of a weight to be updated to the synapse memory 120. The value of the weight to be updated may be determined according to spike timing dependent plasticity (STDP). The STDP is an algorithm to increase or decrease a value of a weight in consideration of a time when a neuron outputs a spike. That is, the neuron module 150 may determine a value of a weight to be updated in consideration of a time of a spike output from the first to third sub-neuron modules 151 to 153.

Figure 10:
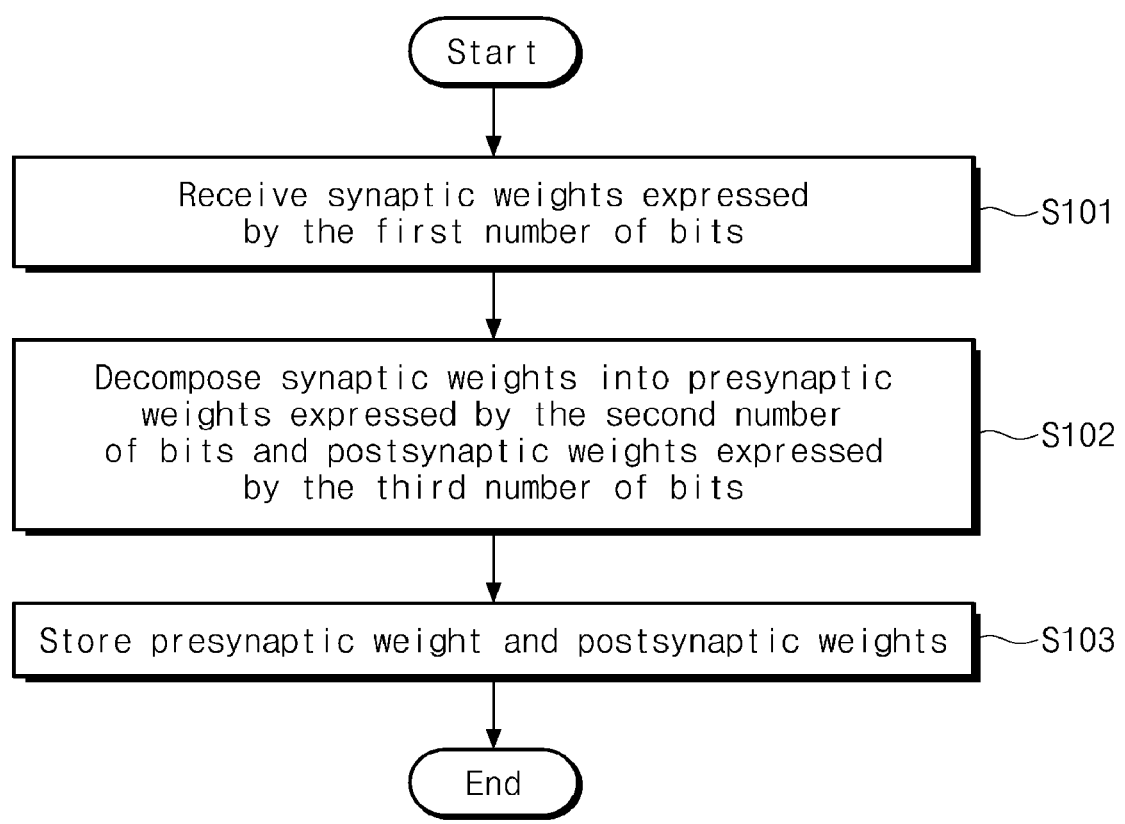
FIG. 10 is a flowchart illustrating a synaptic weight decomposing operation of a neuromorphic processor of FIG. 3.

FIG. 10 is a flowchart illustrating a synaptic weight decomposing operation of a neuromorphic processor of FIG. 3. Referring to FIGS. 3 and 10, in operation S101, the neuromorphic processor 100 may receive synaptic weights expressed by the first number of bits. Synaptic weights may indicate connection strengths of synapses between a first layer including axons and a second layer including neurons.

In operation S102, the neuromorphic processor 100 may decompose synaptic weights into presynaptic weights expressed by the second number of bits and postsynaptic weights expressed by the third number of bits. The third number of bits indicating the precision of a postsynaptic weight may be smaller than the first number of bits indicating the precision of a synaptic weight. The number of presynaptic weights that are generated as a result of the decomposition may be identical to the number of axons in the first layer. The number of postsynaptic weights that are generated as the decomposition result may be identical to the number of synaptic weights (i.e., synapses between the first layer and the second layer).

In operation S103, the neuromorphic processor 100 may store the presynaptic weight and the postsynaptic weights generated of the decomposition result. The neuromorphic processor 100 may store the presynaptic weights and the postsynaptic weights in an internal memory. Alternatively, the neuromorphic processor 100 may store the presynaptic weights and the postsynaptic weights in a memory outside the neuromorphic processor 100.

In an embodiment, in operation S102, the neuromorphic processor 100 may generate an absolute value of each of postsynaptic weights corresponding to synaptic weights being not "0" from among synaptic weights, so as to have an absolute value or less of the corresponding synaptic weight. For example, the neuromorphic processor 100 may generate an absolute value of each of postsynaptic weights corresponding to synaptic weights being not "0", so as to have "1". The neuromorphic processor 100 may generate a value of each of postsynaptic weights corresponding to synaptic weights being "0" from among synaptic weights, so as to have "0". The neuromorphic processor 100 may generate presynaptic weights respectively corresponding to the axons of the first layer based on synaptic weights between the axons of the first layer and the neurons of the second layer.

Figure 11:
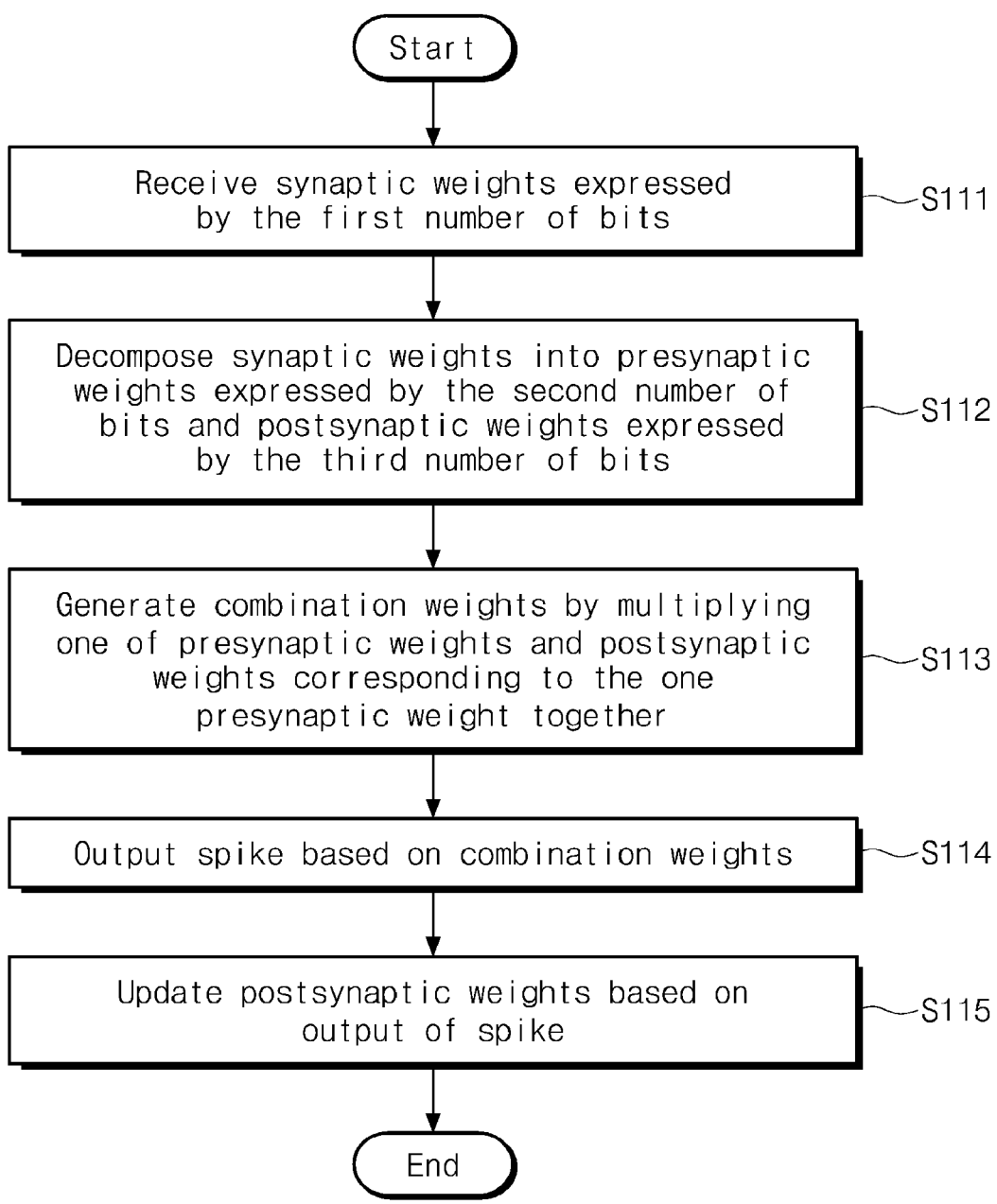
FIG. 11 is a block diagram illustrating a learning operation of a neuromorphic processor of FIG. 3.

FIG. 11 is a block diagram illustrating a learning operation of a neuromorphic processor of FIG. 3. Referring to FIGS. 3 and 11, in operation S111, the neuromorphic processor 100 may receive synaptic weights expressed by the first number of bits; in operation S112, the neuromorphic processor 100 may decompose the synaptic weights into presynaptic weights expressed by the second number of bits and postsynaptic weights expressed by the third number of bits. Operation S111 and operation S112 of FIG. 11 are similar to operation S101 and operation S102 of FIG. 10, and thus, additional description will be omitted to avoid redundancy.

In operation S113, the neuromorphic processor 100 may generate combination weights by multiplying one of presynaptic weights and postsynaptic weights corresponding to the one presynaptic weight together. The generated combination weights may correspond to a specific axon of axons in a first layer. In operation S114, the neuromorphic processor 100 may output a spike based on the generated combination weights. The neuromorphic processor 100 may output a spike corresponding to each neuron based on a combination weight corresponding to each neuron. In operation S115, the neuromorphic processor 100 may update postsynaptic weights based on the output of the spike. The neuromorphic processor 100 may determine a value of a postsynaptic weight to be updated, based on a time to output a spike corresponding to each neuron.

As illustrated in FIG. 11, the neuromorphic processor 100 may perform operation S111 to operation S115 to perform learning, but the inventive concepts is not limited thereto. For example, the neuromorphic processor 100 may perform the learning by continuously updating postsynaptic weights through the iteration of operation S113 to operation S115.

Figure 12:
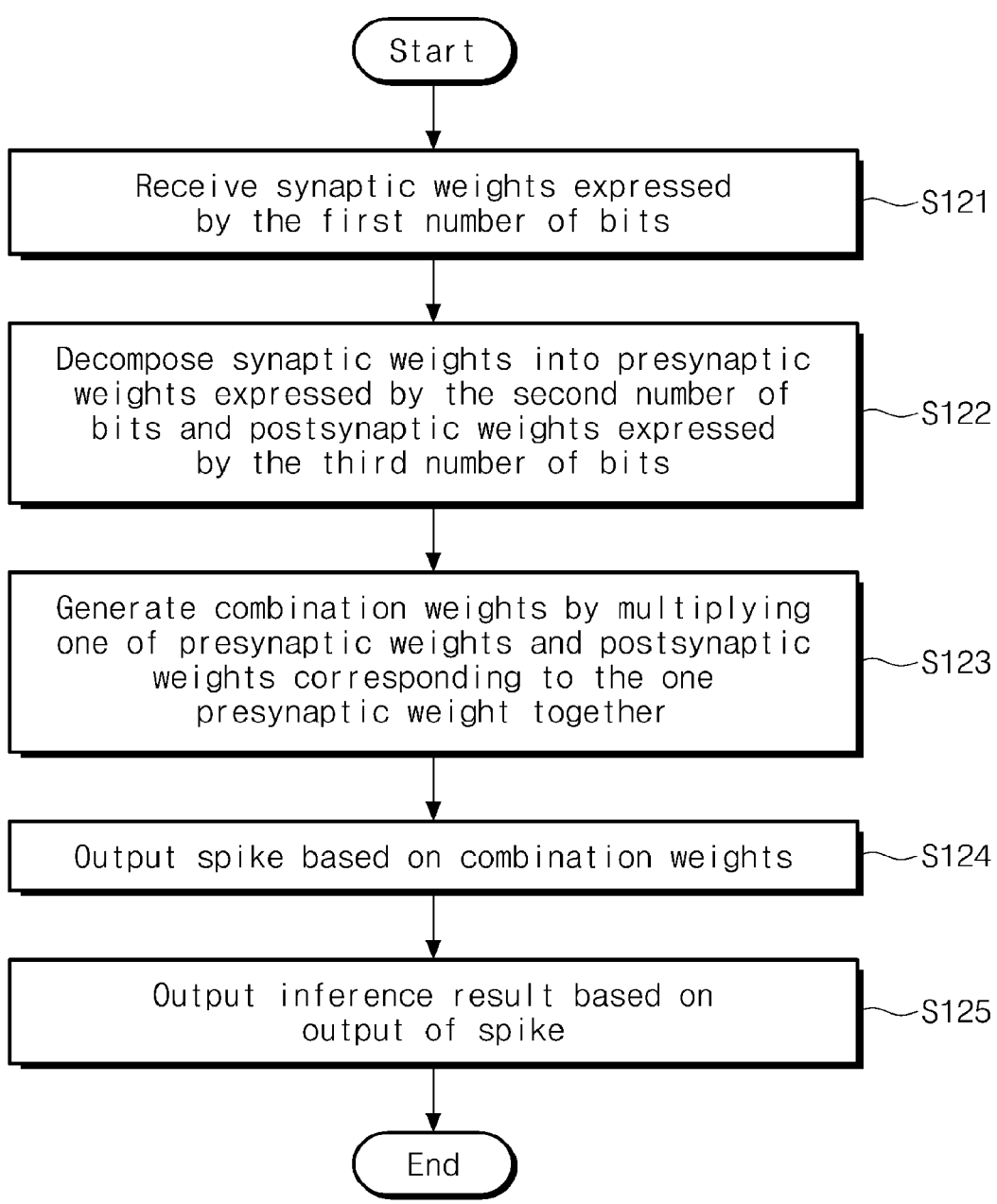
FIG. 12 is a block diagram illustrating an inference operation of a neuromorphic processor of FIG. 3.

FIG. 12 is a block diagram illustrating an inference operation of a neuromorphic processor of FIG. 3. Referring to FIGS. 3 and 12, in operation S121, the neuromorphic processor 100 may receive synaptic weights expressed by the first number of bits. In operation S122, the neuromorphic processor 100 may decompose synaptic weights into presynaptic weights expressed by the second number of bits and postsynaptic weights expressed by the third number of bits. In operation S123, the neuromorphic processor 100 may generate combination weights by multiplying one of presynaptic weights and postsynaptic weights corresponding to the one presynaptic weight together. In operation S124, the neuromorphic processor 100 may output a spike based on the combination weights. Operation S121 and operation S122 of FIG. 12 are similar to operation S101 and operation S102 of FIG. 10, and thus, additional description will be omitted to avoid redundancy. Operation S123 and operation S124 of FIG. 12 are similar to operation S113 and operation S114 of FIG. 11, and thus, additional description will be omitted to avoid redundancy.

In operation S125, the neuromorphic processor 100 may output an inference result based on the output of the spike. For example, in the case where the neuromorphic processor 100 performs character recognition, the neuromorphic processor 100 may receive image data as input data and may output a character, which the received image data indicate, as an inference result. In the case where the neurons of the second layer correspond to different characters, respectively, the neuromorphic processor 100 may output a character based on a spike output from a specific neuron of the neurons. That is, the neuromorphic processor 100 may output a character corresponding to a specific neuron outputting a spike, as an inference result.

As described above, the neuromorphic processor 100 according to embodiments of the inventive concepts may determine the numbers of bits of presynaptic weights and postsynaptic weights decomposed from synaptic weights such that a memory usage is reduced. The neuromorphic processor 100 may perform learning and inference based on combination weights generated from the presynaptic weights and the postsynaptic weights. As such, the memory usage of the neuromorphic processor 100 may be reduced, and the accuracy for data operation and processing may be maintained.

According to an embodiment of the inventive concepts, the memory usage of a neuromorphic processor may be reduced.

Also, the neuromorphic processor according to an embodiment of the inventive concepts may maintain the accuracy for data operation and processing while using a low-capacity memory.

While the inventive concepts has been described with reference to exemplary embodiments thereof, it will be apparent to those of ordinary skill in the art that various changes and modifications may be made thereto without departing from the spirit and scope of the inventive concepts as set forth in the following claims.

What is claimed is:

1. A processor-implemented method for processing data based on a neural network including a first layer including axons and a second layer including neurons, the method comprising:
by one or more processors:
generating presynaptic weights and postsynaptic weights that are different than the presynaptic weights, by decomposing synaptic weights between the first layer and the second layer to reduce a size of a memory used to store the synaptic weights while maintaining accuracy of the neural network, where a number of which the presynaptic weights decomposed from the synaptic weights is identical to a number of the axons so that each axon shares one presynaptic weight across all corresponding neuron connections and eliminating needs to store full-precision weights for each synapse connection for each axon, and a number of the postsynaptic weights decomposed from the synaptic weights is identical to a number of the synaptic weights so that each synapse retains respective connection strength but with reduced bit precision; and
storing the presynaptic weights and the postsynaptic weights in a synapse memory where a memory capacity that is used after the synaptic weights are decomposed into the presynaptic weights and postsynaptic weights is smaller than a memory capacity that is used before the synaptic weights are decomposed while maintaining the accuracy of the neural network.

2. The method of claim 1, wherein the synaptic weights form an M×N weight matrix, the presynaptic weights form a first sub-weight matrix being an M×1 matrix, the postsynaptic weights form a second sub-weight matrix being an M×N matrix, the "M" is a natural number corresponding to the number of the axons, and the "N" is a natural number corresponding to the number of the neurons.

3. The method of claim 1, wherein the generating includes:
generating, based on values of the synaptic weights between each of the axons and the neurons, a presynaptic weight corresponding to each of the axons,
wherein an absolute value of each of the postsynaptic weights respectively corresponding to synaptic weights being not "0" from among the synaptic weights is an absolute value or less of a corresponding synaptic weight and a value of each of the postsynaptic weights respectively corresponding to synaptic weights being "0" from among the synaptic weights is "0".

4. The method of claim 3, wherein the absolute value of each of the postsynaptic weights respectively corresponding to the synaptic weights being not "0" is generated to have "1".

5. The method of claim 1, wherein the presynaptic weight corresponding to each of the axons is generated to have a value proportional to a value that is obtained by performing root-mean-square on the values of the synaptic weights between each of the axons and the neurons.

6. The method of claim 1, further comprising:
generating combination weights by multiplying one presynaptic weight of the presynaptic weights and postsynaptic weights corresponding to the one presynaptic weight; and
outputting a spike based on the combination weights, wherein the postsynaptic weights are generated with reduced bit precision.

7. The method of claim 6, further comprising:
updating the postsynaptic weights based on the output of the spike.

8. The method of claim 7, wherein the updating of the postsynaptic weights is determined based on a time to output the spike.

9. The method of claim 7, further comprising:
updating the postsynaptic weights based on values of the updated postsynaptic weights.

* * * * *